United States Patent [19]

Welch et al.

[11] 4,199,475

[45] Apr. 22, 1980

[54] CATALYST FOR PRODUCING POLYMERS OF ETHYLENE

[75] Inventors: M. Bruce Welch; Darryl R. Fahey, both of Bartlesville, Okla.

[73] Assignee: Phillips Petroleum Company, Bartlesville, Okla.

[21] Appl. No.: 944,941

[22] Filed: Sep. 22, 1978

[51] Int. Cl.² ............................................. C08F 4/64
[52] U.S. Cl. .............................. 252/429 C; 252/428; 252/430; 526/116
[58] Field of Search ............... 252/429 C, 428, 430, 252/441

[56] References Cited

U.S. PATENT DOCUMENTS

| | | | |
|---|---|---|---|
| 3,166,542 | 1/1965 | Orzechowski et al. | 252/429 C X |
| 3,218,266 | 11/1965 | Ludlum | 252/429 C |
| 3,490,219 | 1/1970 | Ozawa et al. | 57/34 |
| 3,591,656 | 7/1971 | Kroll | 252/429 C X |
| 3,594,330 | 7/1971 | Delbouille et al. | 252/429 C |
| 3,696,086 | 10/1972 | Wagensommer | 252/429 C X |
| 3,707,530 | 12/1972 | Calcagno et al. | 252/429 C X |
| 3,766,158 | 10/1973 | Yamaguchi et al. | 252/429 C X |
| 3,855,324 | 12/1974 | Mertzweiller et al. | 252/429 C X |
| 3,899,477 | 8/1975 | Altemore et al. | 252/429 C X |
| 3,996,163 | 12/1976 | Crump et al. | 252/429 C X |

*Primary Examiner*—Patrick Garvin

[57] ABSTRACT

A catalyst for producing polymers of ethylene in which a first composition prepared by reacting an inorganic support containing surface hydroxyl groups with titanium or vanadium compounds which also comprise halogen and/or OR groups wherein R is hydrocarbyl is further reacted to form a second composition by subsequent contact with a compound of titanium or vanadium as defined above chosen from compounds of the metal not reacted to form the first composition, producing a third composition by reaction of the second composition with an organoaluminum compound with the third composition being reacted with titanium tetrahalide to form the catalyst composite. A method for producing polymers of ethylene by contacting ethylene monomer in the presence of the catalyst composite described above and an organoaluminum compound under conditions suitable for polymerization.

11 Claims, No Drawings

CATALYST FOR PRODUCING POLYMERS OF ETHYLENE

BACKGROUND OF THE INVENTION

This invention relates to the production of polymers of ethylene. In one of its aspects this invention relates to catalyst systems suitable for producing polymers of ethylene. In another of its aspects, this invention relates to the preparation of such catalyst systems.

A catalyst system for the production of polymers of olefins that can be demonstrated to yield increased productivity of polymer as compared to other catalyst systems known in the art is of wide interest. Since it is well-known that new combinations of known catalysts or a different method for treating a catalyst composition can produce surprising results in catalyst activity or productivity, recombination of catalyst ingredients and novel treatment methods are constantly being initiated. As a result of such an effort, a new and useful catalyst system for the production of ethylene polymers has been discovered.

It is an object of this invention to provide a catalyst system for the production of polymers of ethylene. It is another object of this invention to provide a method for preparing the catalyst system for the production of polymers of ethylene. It is still another object of this invention to provide a method for producing polymers of ethylene.

Other aspects, objects and the various advantages of this invention will become apparent upon reading the specification and the attached claims.

STATEMENT OF THE INVENTION

A catalyst composite is provided that is useful in conjunction with an organoaluminum compound for producing polymers of ethylene. The catalyst composite is the reaction product of the sequential reactions of an inorganic support containing surface hydroxyl groups with a compound of titanium or vanadium containing halogen and/or OR groups wherein R is hydrocarbyl thereby forming a first composition which is then reacted with a titanium or vanadium compound as defined above chosen from the metal which was not reacted in forming the first composition. This product is then reacted first with an organoaluminum compound and then with a titanium tetrahalide to form the catalytic composite.

In an embodiment of the invention a method is provided for producing the catalytic composite useful in conjunction with an organoaluminum compound for producing polymers of ethylene. The method comprises: reacting an inorganic support containing surface hydroxyl groups with a compound chosen from among titanium and vanadium compounds containing halogen and/or OR groups wherein R is hydrocarbyl to form a first composition; reacting the first composition with a titanium or vanadium compound as defined above chosen from the metal that is not reacted to form the first composition thereby forming a second composition; reacting the second composition with an organoaluminum compound to form a third composition; and reacting the third composition with titanium tetrahalide to form the catalytic composite.

In a further embodiment of the invention, ethylene monomer is contacted under polymerization conditions in the presence of the catalytic composite described above and and organoaluminum compound to produce polymers of ethylene.

The inorganic supports usefully employed consist of particulate materials such as silica, alumina, thoria, titania, zirconia and combinations thereof such as silica-alumina, silica-titania, etc., and magnesium compounds containing hydroxyl groups, e.g., Mg(OH)Cl. (Suitable compounds are described in U.S. Pat. No. 3,694,421 col. 1, 2). It is essential that the support material contain surface hydroxyl groups which can react with at least a portion of the titanium and/or vanadium compound which contacts it to fix the metal compound(s) to the surface. Surface water must be removed, however. The support material, therefore, is dried by calcination at a temperature sufficiently high and for a suitable period of time to remove surface water bound thereto but not high enough to remove the chemically bound surface hydroxyl groups. For example, with silica-containing supports, the maximum calcining temperature should not exceed about 1000° C. (1830° F.) and preferably ranges from about 200°–900° C. (390°–1650° F.). The magnesium compounds are dried at temperatures ranging from about 110°–300° C. Generally, the calcining is conducted at about atmospheric pressure in an air oven, although inert ambients such as nitrogen can also be employed. The heating can be conducted under reduced pressure if desired.

The length of heating time used is dependent upon the calcining temperature employed. It can range from about 0.5 hour at the highest temperature to about 24 hours or longer at the lowest temperature.

The granulometry of the solid support is not critical. However, supports which provide a free flowing catalyst are more preferred, e.g., those containing particle sizes ranging between about 30–250 microns (60–450 mesh. U.S. Sieve Series). Since the shape of the polymer particles appear to be related to the shape of the catalyst particles, those supports having particles which are generally spherical in nature are desirably employed. The spherical particles can be obtained, for example, by spray drying silica-containing hydrogels and solutions or melts of the magnesium compounds, as is known in the art.

The weight ratio of particulate support to initial titanium or vanadium compound composition can vary rather widely. Generally, it can range from about 0.1:1 to about 20:1 and preferably about 2:1 to about 10:1 since particularly active catalysts are obtained in that range.

The titanium compounds used in preparing the catalytic composite are described by the formula $Ti(OR)_nX_{4-n}$ in which R is selected from among alkyl, cycloalkyl, aryl, acyl groups and combinations thereof such as alkaryl. Each group can contain from 1 to about 20 carbon atoms per molecule. The subscript n designates 0,1,2,3 or 4 and X is bromide, chloride, or iodide, more usually bromide or chloride. Exemplary compounds include titanium tetraacetate, titanium tetramethoxide, titanium tetraethoxide, titanium tetraeicosyloxide, titanium tetracyclohexyloxide, titanium tetrabenzyloxide, titanium trimethoxidebutoxide, titanium ethoxytrichloride, titanium dibutoxidedioctadecyloxide, titanium diisopropoxydibromide, titanium phenoxytrichloride, titanium tri-o-xylenyloxychloride, titanium tetrabromide, titanium tetrachloride and titanium tetraiodide. A titanium alkoxide, particularly titanium tetraethoxide, is presently preferred.

The vanadium compounds used in preparing the catalytic composite can be $VX_4$ or have the general formula $VO(OR')_mX_{3-m}$ in which R' is as described before. Representative compounds include vanadium tetrachloride, trimethyl vanadate, triethyl vanadate, tridodecyl vanadate, trieicosyl vanadate, diethoxy vanadium chloride, n-butoxy vanadium dibromide, vanadium oxytribromide and vanadium oxytrichloride. Vanadium oxytrichloride is presently preferred.

Although an effective catalyst can be formed without the presence of OR groups, it is necessary that a combination of titanium, vanadium, —X or —OR groups be present in order to achieve the best results. Thus, for example, the reactants can be titanium alkoxide and a vanadium oxytrihalide or the reactants can be a titanium tetrahalide and a trialkyl vanadate. A presently preferred combination consists of titanium tetraethoxide and vanadium oxytrichloride.

The mole ratio of vanadium compound to titanium compound can range from about 0.1:1 to about 10:1, more preferably from 0.25:1 to about 2:1 and even more preferably about 1:1.

Forming the catalytic composite is carried out by reacting the supported mixture of titanium and vanadium compounds with an organometallic compound of Group I–III of the Periodic Table of elements, *Handbook of Chemistry and Physics*, Chemical Rubber Company, 54th edition, 1973, page B3, and, in particular, with an organoaluminum compound selected from among alkylaluminum alkoxides, dialkylaluminum halides, alkylaluminum dihalides and mixtures thereof including alkylaluminum sesquihalides. The number of carbon atoms in each alkyl group can range from 1 to about 20. Exemplary compounds include dieicosylaluminum bromide, diethylaluminum chloride, dioctylaluminum iodide, dieicosylaluminum chloride, ethylaluminum dichloride, dodecylaluminum dibromide, dioctadecylaluminum iodide, ethylaluminum sesquichloride, isobutylaluminum sesquibromide, diethylaluminum ethoxide, and the like. A presently preferred compound is ethylaluminum sesquichloride.

The mole ratio of organometallic compound to the supported mixture of titanium plus vanadium compounds can be varied. However, it is preferred that the gram-atom ratio of aluminum to titanium plus vanadium range from about 0.5:1 to about 10:1, more preferably from about 0.7:1 to about 3:1.

Completing the formation of the catalytic composite is carried out by contacting the product of the organometal reaction (composition 3) with titanium tetrahalide preferably $TiCl_4$, at a temperature sufficient to provide a reaction. The reaction temperature generally ranges from about 10 to about 150° C. More preferred is a temperature range from about 20 to about 120° C. A weight ratio of $TiCl_4$ to composition 3 ranging from about 10:1 to about 0.1:1, more preferably from about 7:1 to about 0.25:1 is used. Generally, a hydrocarbon diluent, e.g., n-hexane or n-heptane, is also present in amounts ranging from about 2 to about 20 parts by weight per weight of the composition 3 product to facilitate the treating process. Treatment time can vary from about 0.1 to about 10 hours, more preferably from about 0.5 to about 6 hours. Following the treatment, the catalytic composite is filtered off, washed with fresh portions of dry diluent, and dried overnight by evaporation of solvent in a dry box. It is within the scope of the invention to repeat the titanium tetrahalide treatment two or more times.

Used with the catalytic composite for production of polymers is an organoaluminum compound of the formula $AIR''_aX'_{3-a}$ where R" represents hydrogen or an alkyl or aryl group containing from 1 to about 20 carbon atoms, X' is bromide, chlorine or iodine or an alkoxy group containing from 1 to about 12 carbon atoms and a is an integer of 1 to 3. When X' is alkoxy, a is 2. Exemplary compounds include trihydrocarbyl aluminum compounds such as trimethylaluminum, triethylaluminum, tridodecylaluminum, trieicosylaluminum, triphenylaluminum, dihydrocarbylaluminum halides such as diethylaluminum chloride, dibutylaluminum bromide; hydrocarbylaluminum dihalides such as methylaluminum dichloride, isopropylaluminum dibromide; hydrocarbylaluminum alkoxides such as dimethylaluminum ethoxide, didodecylaluminum dodecyloxide; and hydrocarbylaluminum sesquihalides such as ethylaluminum sesquichloride. Presently preferred are trialkylaluminum compounds, particularly triethylaluminum.

The molar ratio of organometallic compound to catalytic composite ranges from about 1:1 to about 1500:1, preferably about 2:1 to about 1000:1, in terms of Al/(Ti+V).

The polymerization process used for producing polymers of ethylene, i.e., ethylene homopolymer or ethylene polymerized with a higher aliphatic 1-olefin having from 3 to about 10 carbon atoms, according to this invention, can be any of the well-known processes including batch and continuous processes. As an example of a batch process, a stirred autoclave can be prepared by first purging with nitrogen and then with isobutane. A cocatalyst solution containing an organoaluminum halide and then a catalyst produced as set out above are introduced into the reactor through an entry port under an isobutane purge. The port is closed and hydrogen, if any, and isobutane are added. The autoclave is then heated to the desired reaction temperature in the range of about 50° C. to about 120° C. and the ethylene is then introduced and maintained at a constant partial pressure in the range of about 0.5 to about 5.0 MPA. At the end of a designated reaction time, usually about 0.5 to about 5 hours, the ethylene addition is terminated and unreacted ethylene and isobutane are vented. The reactor is then opened and the polyethylene product is collected as a free-flowing white solid. The polymeric product is air dried.

In a continuous process, a suitable reactor such as a loop reactor is continuously charged with suitable quantities of solvent or diluent, catalyst, cocatalyst, ethylene, hydrogen (if any), and comonomer (if any). Reactor product is continuously withdrawn and solid polymer recovered from it by suitable means such as by flashing.

EXAMPLE 1

CATALYST PREPARATION

A series of catalysts was prepred by contacting dried silica in a dry box with the components described below. Catalyst A (control): 36 g of Davison Grade 969 MS (microspheroidal) silica, previously dried at 400° F. (204° C.) was placed in a 3-neck round bottom glass flask flushed with nitrogen and equipped for refluxing and stirring. The silica was slurried in about 250 ml of dry n-hexane, 11.2 ml (11.1 g, 0.042 mole) of titanium tetraisopropoxide [$Ti(Oi-C_3H_7)_4$] added, stirred and evaporated to dryness. The weight ratio of support to Ti(Oi—C$_3$H$_7$)$_4$ was 3.2:1. The product was reslurried in about 250 ml of dry n-hexane, 30 ml (51.8 g, 0.273 mole) of titanium tetrachloride (TiCl$_4$) was added and the mixture was refluxed for one hour. The resulting mixture was cooled, supernatant liquid decanted and the product was washed with three separate portions (about 100 ml each) of dry n-hexane. The product was dried over a warm water bath. The recovered solid product weight 44.7 g. Catalyst B (invention): 12.2 g of Davison Grade 969 MS silica, previously dried at 400° F. for 3 hours, was slurried in dry n-hexane in the manner described for catalyst A. To the mixture was added 2.6 ml (2.9 g, 0.013 mole) of titanium tetraethoxide [Ti(OC$_2$H$_5$)$_4$], the mixture was refluxed 45 minutes and cooled to room temperature. Then 1.2 ml (2.2 g, 0.013 mole) of vanadyl trichloride (VOCL$_3$) was added, the mixture stirred 30 minutes, 19.5 ml of 25.4 wt.% ethylaluminum sesquichloride (EASC, 0.015 mole) in dry n-heptane added and the mixture stirred 30 minutes. The weight ratio of support to combined Ti(OC$_2$H$_5$)$_4$ plus VOCl$_3$ was 2.4:1. Then 40 ml (69 g, 0.36 mole) of TiCl$_4$ was added, the mixture refluxed 50 minutes and cooled to room temperature. The supernatant liquid was decanted, the slurry washed with a 100 ml portion of dry n-hexane and a 100 ml portion of dry n-pentane and the product dried as before. The dark brown, solid product weighed 24.4 g. Catalyst C (invention): 12.6 g of Davison Grade 969 MS silica, dried as in catalyst B, was slurried in a dry n-hexane as described before. To the mixture was added 1.2 ml (2.2 g, 0.013 mole) of VOCl$_3$, the mixture was refluxed 45 minutes and cooled to room temperature. Then 2.7 ml (3.0 g, 0.013 mole) of Ti(OC$_2$H$_5$)$_4$ was added, the mixture stirred 30 minutes, 20 ml of EASC solution added (0.015 mole) and the mixture stirred 30 minutes. The weight ratio of support to combined VOCl$_3$ plus Ti(OC$_2$H$_5$)$_4$ was 2.4:1. Then 40 ml (69 g, 0.36 mole) of TiCl$_4$ was added and the mixture refluxed, cooled and the product washed and dried as described under catalyst B. The solid purplish-gray product recovered weighed 22.8 g. Catalyst D (invention): 9.8 g of Davison Grade 952 silica, dried at 1600° F. (871° C.) for 3 hours, was slurried in dry n-hexane as before. To the mixture was added 1.3 ml (1.4 g, 0.0063 mole) of Ti(OC$_2$H$_5$)$_4$, the mixture was refluxed 45 minutes and cooled to room temperature. Then 0.6 ml (1.1, 0.0063 mole) of VOCl$_3$ was added, the mixture stirred 30 minutes, 9.8 ml EASC solution was added (0.0075 mole) and the mixture stirred 30 minutes. The weight ratio of support to combined Ti(OC$_2$H$_5$)$_4$ plus VOCl$_3$ was 3.9:1. Then 40 ml of TiCl$_4$ was added and the mixture refluxed, cooled and the product washed and dried as described under Catalyst B. The solid brown product recovered weighed 16.08 g. Catalyst E (invention): 10.7 g of Davison Grade 952 silica, dried at 1300° F. (704° C.) for 3 hours, was slurried in dry n-hexane as before. To the mixture was added 0.65 ml (0.72 g, 0.0032 mole) of Ti(OC$_2$H$_5$)$_4$, the mixture was refluxed 45 minutes and cooled to room temperature. Then 0.3 ml (0.55 g, 0.0032 mole) of VOCl$_3$ was added, the mixture stirred 30 minutes, 4.9 ml EASC solution was added (0.0038 mole) and the mixture stirred 30 minutes. The weight ratio of support to combined Ti(OC$_2$H$_5$)$_4$ plus VOCl$_3$ was 8.4:1. Then 40 ml of TiCl$_4$ was added and the mixture refluxed, cooled and the product washed and dried as described under catalyst B. The solid product recovered weighed 12.7 g. Catalyst F (invention): 12.1 g of Davison Grade 969 MS silica, dried at 400° F. for 3 hours, was slurried in dry n-hexane as before. To the mixture was added 3.8 ml (3.6 g, 0.013 mole) of Ti(Oi—C$_3$H$_7$)$_4$, the mixture was refluxed 1 hour and cooled to room temperature. Then 1.2 ml (2.2 g, 0.013 mole) of VOCl$_3$ was added, the mixture stirred 30 minutes, 19.5 ml EASC solution was added (0.015 mole) and the mixture stirred 30 minutes. The weight ratio of support to combined Ti(Oi—C$_3$H$_7$)$_4$ plus VOCl$_3$ was 2.1:1. Then 40 ml of TiCl$_4$ was added and the mixture refluxed, cooled and the product washed and dried as described under catalyst B. The solid grayish-purple product recovered weighed 21.8 g.

EXAMPLE 2

ETHYLENE POLYMERIZATION

Polymerization of ethylene was conducted in a 1 gallon (3.8 liter) capacity reactor. The cleaned, dry reactor was prepared for each run by flushing it with dry isobutane vapor at room temperature, about 23° C. Then 3 ml of 15 wt % triethylaluminum (TEA) solution in dry n-heptane, amounting to 2.8 millimoles TEA, was charged followed by charging of the catalyst. After sealing the reactor, 2 liters of dry isobutane was charged and the reactor and contents were heated to 80° C. Ethylene was admitted to maintain a partial pressure of 0.69 Mpa(100 delta psig), the total pressure being 1.93 MPa(280 psig), and the ethylene pressure was held constant throughout the run by adding ethylene as required. After 1 hour on stream the ethylene flow was terminated, the reactor was vented and cooled to room temperature. The solid polymer in the reactor was recovered, air dried and weighed to determine the yield.

The weight ratio of support to combined initial titanium compound and/or vanadium compound, weight catalyst employed, polymer yields obtained and calculated productivity results based on g polymer per g catalyst per hour are presented in Table 1.

Run 1 is a control run utilizing a catalyst not prepared in accordance with this invention. The low calculated catalyst productivity of 96 g polyethylene per g catalyst clearly shows that a silica treated only with a titanium alkoxide gives a relatively ineffective catalyst for ethylene polymerization.

The remaining runs are all invention runs. Runs 2 and 3, having calculated catalyst productivities values of 2330 and 2110 g polymer per g catalyst, respectively, demonstrate that the order of reaction of a titanium alkoxide or a vanadyl halide with silica is not important. In run 5, the concentration of titanium alkoxide and vanadyl halide on silica calcined at 704° C. was about ½ the concentration employed on silica calcined at 204° C. The calculated catalyst productivity value obtained in run 5 was about ½ the value obtained in run 2. Thus, catalyst productivity appears to be a function of the level of initial metal compounds reacting with the silica and suggests silica calcining temperature can have importance.

In run 4, the highest catalyst productivity results are shown. The catalyst employed only about ¼ the titanium alkoxide and vanadyl halide levels used in run 2. Nevertheless, catalyst productivity was almost doubled. These results, in combination with the lower catalyst productivity value obtained in run 6, even at the higher level of titanium alkoxide and vanadyl halide employed, indicate that the calcining temperature of the silica is also important. That is, a silica calcining temperature of 871° C. yields a more active catalyst composite than a silica calcining temperature of 204° C.

To summarize, the results show that the silica calcining temperature employed and the levels of titanium alkoxide and vanadyl halide employed both play a role in determining the activity of the invention catalysts in ethylene polymerization. A silica calcining temperature of about 870° C. is more desirable than one of about 200° C. to achieve the most active catalysts. Although active catalysts are found at various levels of titanium alkoxide and vanadyl halide which contacts a support such as silica and the composite treated sequentially with an organoaluminum compound and a titanium tetrahalide, an especially desirable range occurs at about 0.005 to 0.008 moles alkoxide and halide per about 10 g of silica support in this invention.

titanium tri-o-xylenyloxychloride, titanium tetrabromide, titanium tetrachloride and titanium tetraiodide.

4. A method of claim 1 wherein the vanadium compounds are chosen from among vanadium tetrachloride, trimethyl vanadate, triethyl vanadate, tridodecyl vanadate, trieicosyl vanadate, diethoxy vanadium chloride, n-butoxy vanadium dibromide, vanadium oxytribromide and vanadium oxytrichloride.

5. A method of claim 1 wherein the organometallic compounds are chosen from among alkylaluminum alkoxides, dialkylaluminum halides, alkylaluminum dihalides, and mixtures thereof.

6. A composition made by the method of claim 1.

7. A od of claim 1 wherein said titanium tetrahalide of

TABLE 1

| | SILICA | | ETHYLENE POLYMERIZATION CATALYST PREPARATION | | | | Wt. | | |
|---|---|---|---|---|---|---|---|---|---|
| Run No. | g | Calcining Temp. °C. | Component 1 Formula | g | Component 2 Formula | g | Wt. Ratio Support Initial Ti+V | Catalyst Charged mg | Polymer Yield g | Calculated Productivity g polymer/g cat |
| 1 | 36 | 204 | Ti(Oi-C$_3$H$_7$)$_4$ | 11.1 | None | — | 3.2:1 | 136.0 | 13.0 | 96 |
| 2 | 12.2 | 204 | Ti(OC$_2$H$_5$)$_4$ | 2.9 | VOCl$_3$ | 2.2 | 2.4:1 | 42.4 | 99.0 | 2330 |
| 3 | 12.6 | 204 | VOCl$_3$ | 2.2 | Ti(OC$_2$H$_5$)$_4$ | 3.0 | 2.4:1 | 76.3 | 161.0 | 2110 |
| 4 | 9.8 | 871 | Ti(OC$_2$H$_5$)$_4$ | 1.4 | VOCl$_3$ | 1.1 | 3.9:1 | 46.9 | 213.0 | 4540 |
| 5 | 10.7 | 704 | Ti(OC$_2$H$_5$)$_4$ | 0.72 | VOCl$_3$ | 0.55 | 8.4:1 | 58.4 | 63.0 | 1080 |
| 6 | 12.1 | 204 | Ti(Oi-C$_3$H$_7$)$_4$ | 3.6 | VOCl$_3$ | 2.2 | 2.1:1 | 60.9 | 73.0 | 1200 |

We claim:

1. A method for preparing a catalytic composite comprising:
   (a) reacting an inorganic support containing surface hydroxyl groups with a compound chosen from among (1) compounds of the formula Ti(OR)$_n$X$_{4-n}$, (2) VX$_4$, and (3) VO(OR')$_m$X$_{3-m}$ wherein R is selected from among alkyl, cycloalkyl, aryl, acyl and combinations thereof with each group containing from 1 to about 20 carbon atoms, R' is an alkyl group containing from 1 to about 20 carbon atoms, m is 0 to 3, n is 0 to 4, and X is bromide, chloride, or iodide, to form a first composition; and thereafter
   (b) reacting said first composition with a compound of titanium or vanadium as defined above chosen from compounds of the metal not reacted in step (a) to form a second composition; thereafter
   (c) reacting said second composition with an organoaluminum compound to form a third composition; and
   (d) reacting said third composition with titanium tetrahalide to form the catalyst composite.

2. A method of claim 1 wherein said inorganic supports are chosen from silica, alumina, thoria, titania, zirconia, combinations thereof and magnesium compounds containing hydroxyl groups.

3. A method of claim 1 wherein the titanium compounds are chosen from among titanium tetracetate, titanium tetramethoxide, titanium tetrabenzyloxide, titanium trimethoxidebutoxide, titanium ethoxytrichloride, titanium dibutoxidedioctadecyloxide, titanium diisopropoxydibromide, titanium phenoxytrichloride, (d) is TiCl$_4$.

8. A composition consisting essentially of the reaction product of (1) a vanadium compound of the formula VX$_4$ or VO(OR')$_m$X$_{3-m}$ in which R' is an alkyl group containing from 1 to about 20 carbon atoms, m is 0 to 3, and X is bromide, chloride, or iodide and (2) a composition comprising the reaction product of an inorganic support containing surface hydroxyl groups with a titanium compound of the formula Ti(OR)$_n$X$_{4-n}$ in which R is selected from among alkyl, cycloalkyl, aryl, acyl and combinations thereof with each group containing from 1 to about 20 carbon atoms, n is 0 to 4, and X is bromide, chloride, or iodide, said reaction product sequentially reacted with (3) at least one organometallic compound of a metal of Groups I–III of the Periodic Table of Elements and (4) titanium tetrahalide.

9. A composition consisting essentially of the reaction product of (1) a titanium compound of the formula Ti(OR)$_n$X$_{4-n}$ in which R is selected from alkyl, cycloalkyl, aryl, acyl and combinations thereof with each group containing from 1 to about 20 carbon atoms, n is 0 to 4 and X is bromide, chloride or iodide, and (2) a composition comprising the reaction product of an inorganic support containing surface hydroxyl groups with a vanadium compound of the formula VX$_4$ or VO(OR')$_m$X$_{3-m}$ in which R' is an alkyl group containing from 1 to about 20 carbon atoms, m is 0 to 3, and X is bromide, chloride, or iodide said reaction product sequentially reacted with (3) at least one organometallic compound of a metal of Groups I–III of the Periodic Table of Elements and (4) titanium tetrahalide.

10. A composition of claim 8 wherein said titanium tetrahalide of (4) is TiCl$_4$.

11. A composition of claim 9 wherein said titanium tetrahalide of (4) is TiCl$_4$.